United States Patent [19]

Izawa et al.

[11] Patent Number: 4,829,559

[45] Date of Patent: May 9, 1989

[54] FACSIMILE APPARATUS WITH A MODE FOR RECEIVING NON-IMAGE INFORMATION

[75] Inventors: Shoji Izawa, Shizuoka; Hiroshi Fujihira, Mishima; Yoshiaki Yasui, Shizuoka, all of Japan

[73] Assignee: Tokyo Electric Co., Ltd., Tokyo, Japan

[21] Appl. No.: 43,095

[22] Filed: Apr. 27, 1987

[30] Foreign Application Priority Data

May 6, 1986 [JP] Japan .............................. 61-103421

[51] Int. Cl.⁴ .......................... H04M 1/65; H04N 1/00
[52] U.S. Cl. ...................................... 379/96; 358/257;
379/70; 379/100; 379/97
[58] Field of Search .................... 379/74, 77, 82, 97,
379/100, 104, 105, 96, 110, 70; 358/257

[56] References Cited

U.S. PATENT DOCUMENTS

| | | | |
|---|---|---|---|
| 3,711,649 | 1/1973 | Ando | 379/82 |
| 3,870,821 | 3/1975 | Steury | 379/96 |
| 4,304,968 | 12/1981 | Klausner et al. | 379/70 |
| 4,340,783 | 7/1982 | Sugiyama et al. | 379/77 |
| 4,584,434 | 4/1986 | Hashimoto | 379/100 |
| 4,639,553 | 1/1987 | Kiguchi | 379/100 |
| 4,658,417 | 8/1987 | Hashimoto | 379/97 |
| 4,660,218 | 4/1987 | Hashimoto | 379/82 |
| 4,672,459 | 6/1987 | Kudo | 358/257 |
| 4,677,660 | 6/1987 | Yoshida | 379/100 |
| 4,694,352 | 9/1987 | Ina et al. | 358/257 |
| 4,759,093 | 7/1988 | Satomi et al. | 358/257 |

FOREIGN PATENT DOCUMENTS

| | | | |
|---|---|---|---|
| 58-31659 | 2/1983 | Japan | 358/286 |
| 58-187066 | 11/1983 | Japan | 358/286 |
| 59-117369 | 7/1984 | Japan | 358/286 |
| 60-70867 | 4/1985 | Japan | 358/256 |
| 60-134552 | 7/1985 | Japan | 358/256 |
| 60-248057 | 12/1985 | Japan | 379/100 |
| 2166624 | 5/1986 | United Kingdom | 379/100 |

OTHER PUBLICATIONS

Title page and p. 108 of "Telephony", Oct. 14, 1985, vol. 209, No. 16.
Panafax, Corp. "Facsimile Machine/Model UF-4-WAD", *Telephony*, vol. 209, No. 16, p. 108.

*Primary Examiner*—Alan Faber
*Assistant Examiner*—James Tomassini
*Attorney, Agent, or Firm*—Frishauf, Holtz, Goodman & Woodward

[57] ABSTRACT

A communication terminal apparatus includes a telephone circuit for generating a detection signal in response to a received calling signal in an automatic receiving mode, and a control unit for transmitting an answer-back tone signal in response to the detection signal from the telephone circuit. After transmitting the answer-back tone signal, in response to externally supplied DTMF signals representing a data input start signal, key-in data, and a data input end signal, the control unit sequentially stores the key-in data in a memory and drives a printer on the basis of the key-in data stored in the memory.

20 Claims, 5 Drawing Sheets

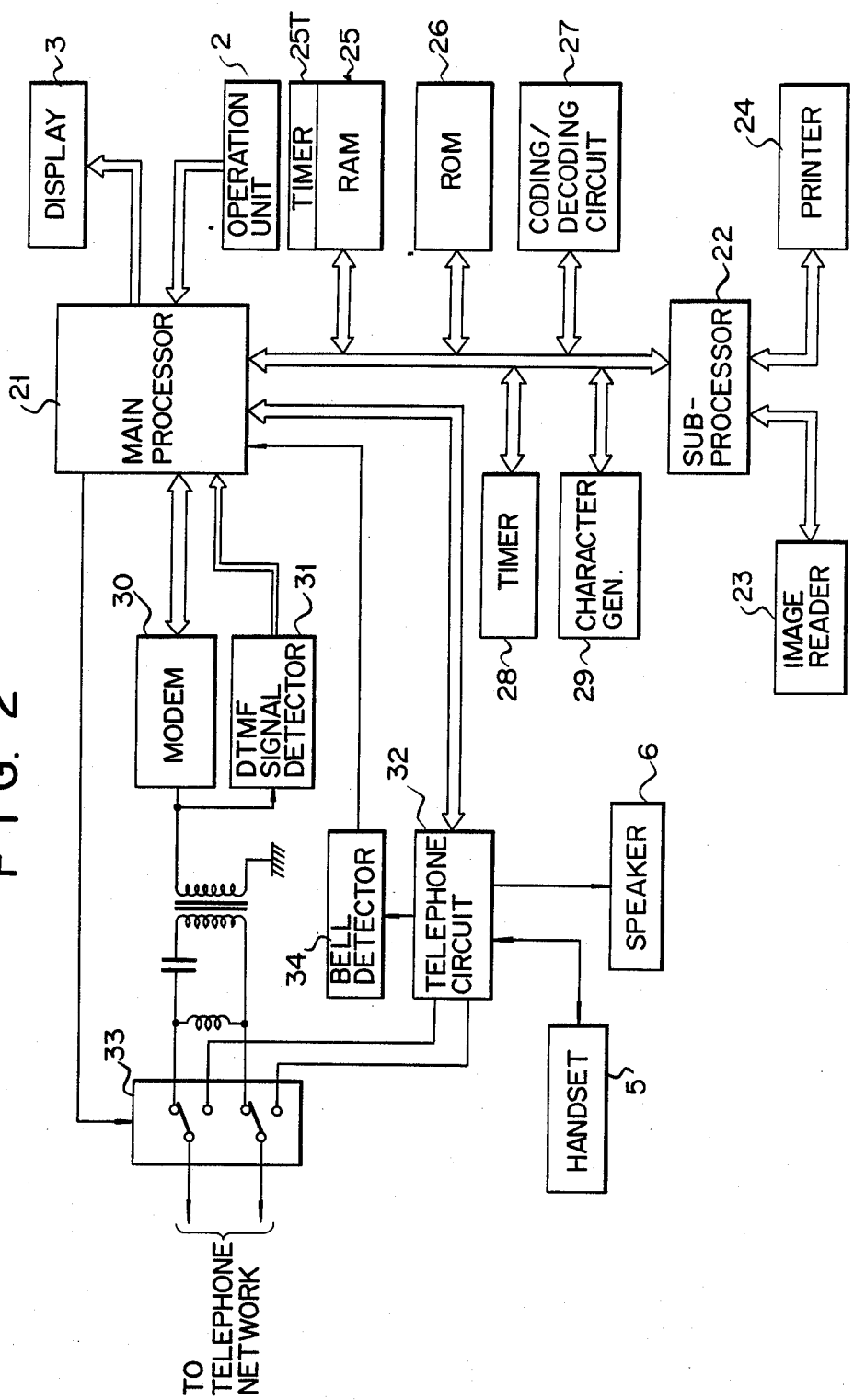
F I G. 2

F I G. 5

| b7b6b5<br>b4~b1 | 000 | 001 | 010 | 011 | 100 | 101 | 110 | 111 |
|---|---|---|---|---|---|---|---|---|
| | 0 | 1 | 2 | 3 | 4 | 5 | 6 | 7 |
| 0000 00 | NUL | TC7(DLE) | SP | 0 | @ | P | | p |
| 0001 01 | TC1(SOH) | DC1 | | 1 | A | Q | a | q |
| 0010 02 | TC2(STX) | DC2 | # | 2 | B | R | b | r |
| 0011 03 | TC3(ETX) | DC3 | | 3 | C | S | c | s |
| 0100 04 | TC4(EOT) | DC4 | $ | 4 | D | T | d | t |
| 0101 05 | TC5(ENQ) | TC8(NAK) | % | 5 | E | U | e | u |
| 0110 06 | TC6(ACK) | TC9(SYN) | & | 6 | F | V | f | v |
| 0111 07 | BEL | TC10(ETB) | ' | 7 | G | W | g | w |
| 1000 08 | FE0(BS) | CAN | ~ | 8 | H | X | h | x |
| 1001 09 | FE1(HT) | EM | × | 9 | I | Y | i | y |
| 1010 10 | FE2(LF) | SUB | + | : | J | Z | j | z |
| 1011 11 | FE3(VT) | ESC | , | ; | K | | k | |
| 1100 12 | FE4(FF) | IS4(FS) | - | < | L | | l | |
| 1101 13 | FE5(CR) | IS3(GS) | | = | M | | m | |
| 1110 14 | SO | IS2(RS) | / | > | N | | n | ~ |
| 1111 15 | SI | IS1(US) | | ? | O | | o | DEL |

FACSIMILE APPARATUS WITH A MODE FOR RECEIVING NON-IMAGE INFORMATION

BACKGROUND OF THE INVENTION

The present invention relates to a communication terminal apparatus for recording an image signal received through a telephone network.

An example of such a communication terminal apparatus having a function for recording data received through a telephone network is a facsimile apparatus. When a conventional facsimile apparatus receives a dialing signal from a normal telephone set in an automatic receiving mode, the facsimile apparatus transmits an answer-back tone signal to a corresponding apparatus. However, in this case, since the corresponding apparatus is a normal telephone set, the facsimile apparatus does not perform any particular operation, and thus maintains a silent state. Therefore, the operator of the corresponding apparatus can do nothing apart from putting the handset down and interrupts the line without knowing the cause of the communication error.

For this reason, some recently developed facsimile apparatuses transmit a preset message such as "This is a facsimile" to a corresponding apparatus, so as to inform the operator of the corresponding apparatus that this side (called side) is a facsimile apparatus; or when some facsimile receive a conversation-start signal from the corresponding apparatus and if the corresponding apparatus is also a facsimile apparatus, then they inform the operator of this fact by means of, for example, an alarm sound. However, the former apparatus cannot provide the operator with information identifying the caller and hence cannot communicate at all with the corresponding apparatus. The latter apparatus requires a facsimile apparatus as a corresponding apparatus and hence cannot communicate with a normal telephone set. Furthermore, in the latter case, an alarm sound is useless if an operator is not near the facsimile apparatus.

SUMMARY OF THE INVENTION

It is therefore an object of the present invention to provide a communication terminal apparatus capable of recording a message supplied from a normal telephone set.

The above object is achieved by a communication terminal apparatus comprising: switching means having a first port connected to a telephone network in an automatic receiving mode and a second port connected to the telephone network in an automatic answering mode; telephone circuit means, connected to the first port of the switching means, for generating a detection signal in response to a calling signal supplied through the switching means; data transfer means, connected to the second port of the switching means, for generating key-in and image data corresponding to DTMF signals and image information, which are supplied through the switching means; printing means; first memory means; and controlling means for supplying a switching signal to the switching means, in response to the detection signal from the telephone circuit means, to set the switching means in the automatic answering mode and then transmitting an answer-back tone signal through the data transfer means and the switching means, and in response to DTMF signals representing a data input start signal, the key-in data, and a data input end signal, which are supplied through the second port of the switching means, sequentially storing the key-in data generated from the data transfer means in the memory, and driving the printing means on the basis of the key-in data stored in the memory means.

According to the present invention, by recording data corresponding to a DTMF signal received after an answer-back tone signal is generated, desired information such as a telephone number can be recorded.

BRIEF DESCRIPTION OF THE DRAWINGS

FIG. 2 is a block diagram of the facsimile apparatus shown in FIG. 1;

FIG. 5 is a conversion table used in a facsimile apparatus according to another embodiment of the present invention.

DETAILED DESCRIPTION OF THE PREFERRED EMBODIMENTS

A facsimile apparatus according to an embodiment of the present invention will now be described in detail, with reference to the accompanying drawings.

Figure 1:
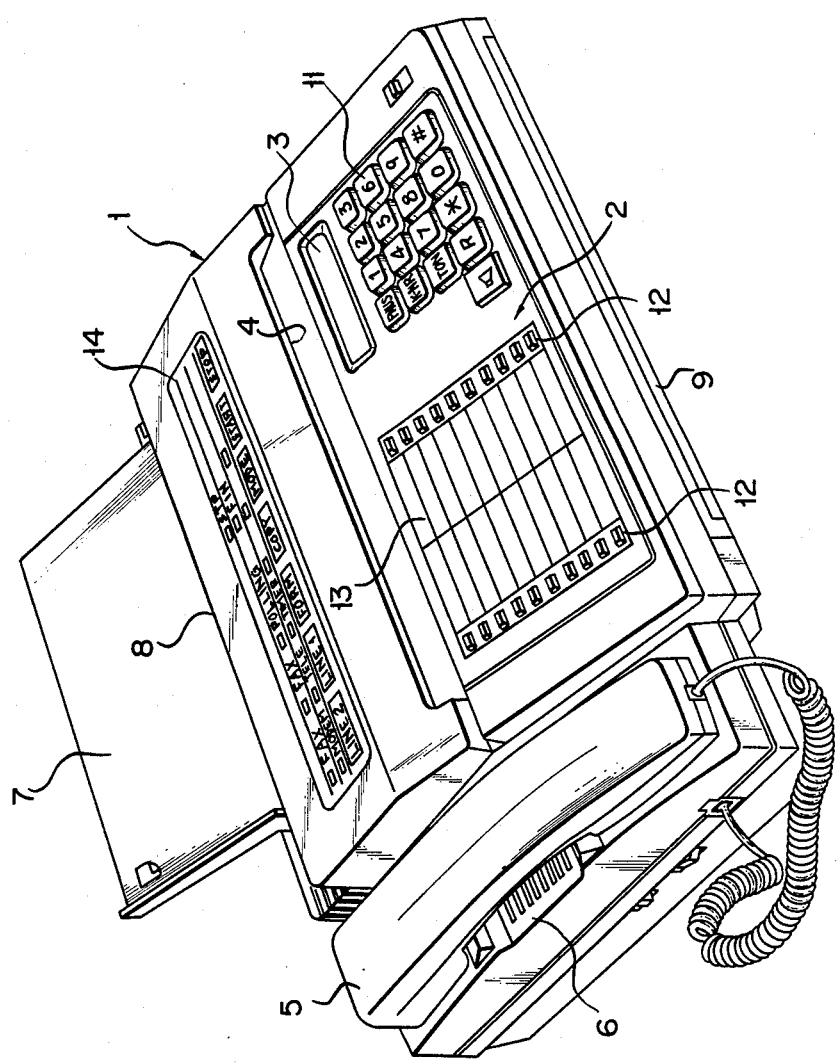
FIG. 1 is a perspective view of a facsimile apparatus according to an embodiment of the present invention.

FIG. 1 is a perspective view showing an outer appearance of a facsimile apparatus which includes: box 1; operation unit 2, display 3, and document-discharging port 4 provided on an upper surface of box 1; handset 5 and speaker 6 provided at a side of box 1; document insertion guide 7 and document insertion port 8 provided at a rear portion of box 1; and recording paper-discharging port 9 provided at a front portion of box 1.

Unit 2 includes key telephone set keyboard 11, one-touch dialing buttons 12, name panel 13 provided in correspondence with buttons 12, and facsimile keyboard 14.

Display 3 is of, for example, a liquid crystal type, and displays a dialed telephone number, the time, and a necessary message.

FIG. 2 is a block diagram showing a circuit configuration of the facsimile apparatus shown in FIG. 1. The facsimile apparatus includes main processor 21 constituting a controller main body, and subprocessor 22 connected to processor 21 to control image reader 23, and printer 24 as a recording unit. Reader 23 optically reads images, such as characters and figures on a document inserted from port 8, and converts them into electrical signals.

Processor 21 is connected to unit 2, display 3, RAM 25 for temporarily storing input data, ROM 26 for storing program data and the like, image data-coding/decoding circuit 27, timer 28 for counting data and time, and character generator 29.

Processor 21 is also connected to facsimile (FAX) modem (modulator/demodulator) 30, DTMF signal detector 31 for detecting a DTMF signal, and telephone circuit 32.

Circuit 32 is connected to a telephone network via first contacts of switching contact circuit 33. Bell detector 34 is connected to circuit 32, and when circuit 32 receives a calling signal, detector 34 detects this and outputs a detection signal to processor 21. Handset 5 and speaker 6 are connected to circuit 32.

Modem 30 and detector 31 are connected to the telephone network via second contacts of circuit 33.

Processor 21 normally displays the date and time from timer 28 on display 3.

Figure 3:
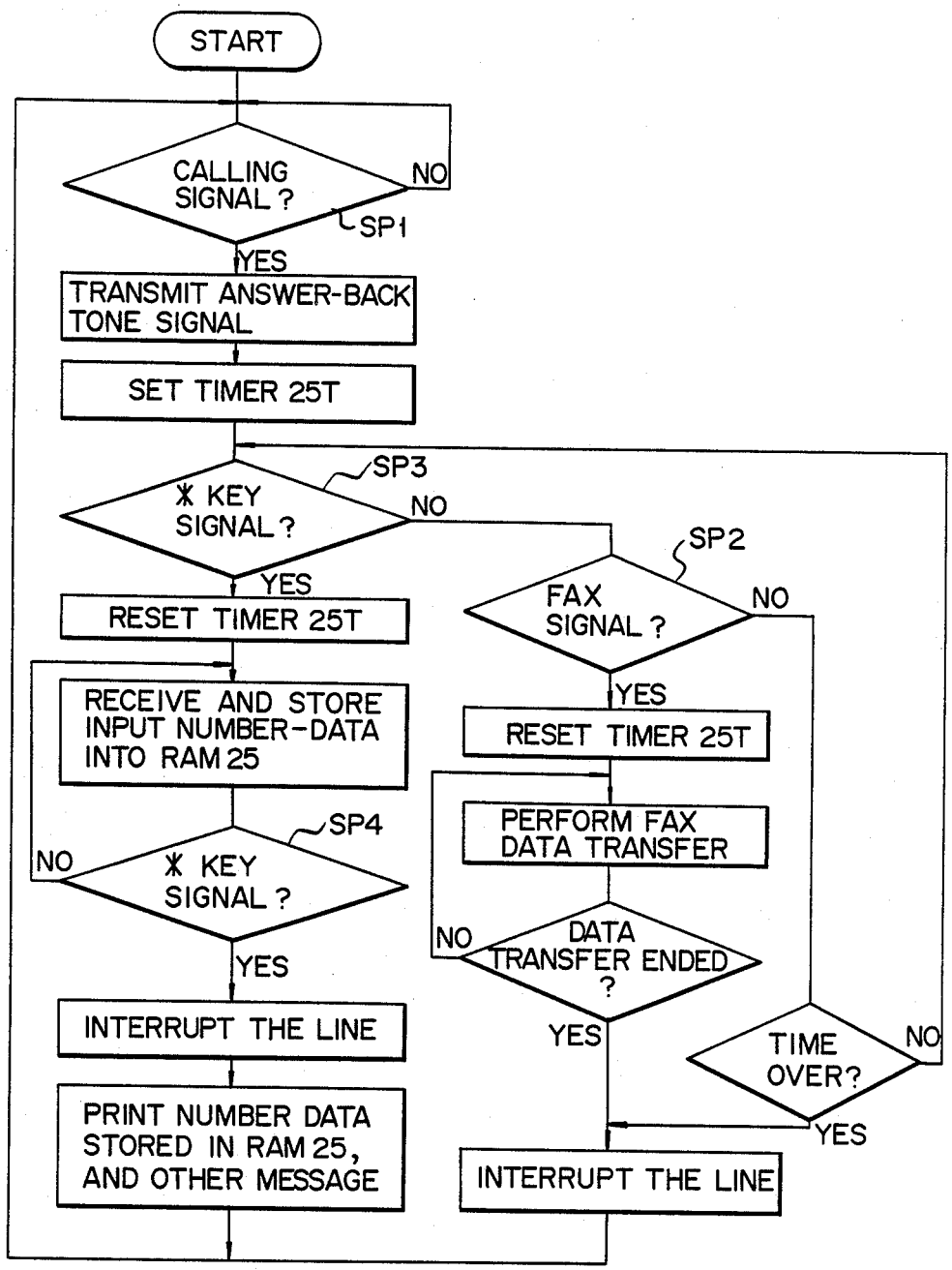
FIG. 3 is a flow chart for explaining the operation of the facsimile apparatus shown in FIG. 1.

When processor 21, in an automatic receiving mode, receives a calling signal through the telephone network, it performs receiving control, as shown in FIG. 3. In other words, when it detects that a detection signal is input from detector 34, which has detected that a calling signal is input to circuit 32 in step SP1, processor 21 supplies a switching control signal to circuit 33, so that circuit 33 is switched from a first switching position to a second switching position, sets processor 21 in the automatic answering mode, and transmits an answerback tone signal, such as a CED (called-station identification) signal or a DIS (digital identification signal), to a corresponding apparatus. Thereafter, processor 21 sets timer 5T, provided in RAM 25, so that timer 25T starts a count operation.

In step SP2, when processor 21 detects that a facsimile signal is received from the corresponding apparatus before the time period set in timer 25T has expired, processor 21 resets timer 25T and performs facsimile communication processing. Processor 21 causes RAM 25 to temporarily store the facsimile signal fetched through modem 30. Therefore, processor 21 causes circuit 27 to decode the facsimile signal, and supplies the decoded signal to subprocessor 22, to cause printer 24 to print it out. When processor 21 detects that reception is completed, it switches circuit 33 from the second to the first switching position, to interrupt the line, and completes the response operation, to return to the automatic receiving mode.

When an asterisk key signal is transmitted from the corresponding apparatus before the time period set in timer 25T has expired (in this case, assuming that a corresponding operator knows, beforehand, the method of inputting a telephone number), and detector 31 detects this, processor 21 fetches the detection signal and detects that the asterisk (*) key signal has been received, in step SP3. Thereafter, processor 21 resets timer 25T, prevents retransmission of a facsimile DIS signal, and sequentially fetches a DTMF signal, such as a telephone number signal detected through DTMF signal detector 31, to store them in RAM 25. When circuit 31 detects a second asterisk signal, processor 21 fetches the detection signal and detects that the asterisk signal has been received, in step SP4. Then, processor 21 switches circuit 33 from the second to the first switching position, to interrupt the line. Thereafter, processor 21 edits preset message data and date and time data of timer 28 as printing data, converts edited data into character data by means of generator 29, and supplies them to subprocessor 22, to cause printer 24 to print them out. Then, processor 21 restores the normal automatic receiving state.

Note that when no signal is received before the time period set in timer 25T has expired, processor 21 interrupts the line and restores the normal automatic receiving state.

In order to transmit a facsimile signal, a document having images to be transmitted is set in port 8 by way of insertion in guide 7. In this state, keyboard 11 or button 12 is operated to input a dialing number of the corresponding apparatus, and keyboard 14 is operated.

Then, processor 21 causes circuit 27 to code a read signal from reader 23 and transmits a facsimile signal to the telephone network via modem 30. Note that in this case, the dialing number of the corresponding apparatus is displayed on display 3.

According to the embodiment having the above arrangement, when the corresponding apparatus similarly has a facsimile function, the facsimile apparatus set in the automatic receiving mode can receive the facsimile signal from the corresponding apparatus, and print it out by printer 24. In this case, by setting a document in port 8, the image on a document can be read by reader 23 and transmitted to the corresponding apparatus.

Figure 4:
FIG. 4 is a view showing an example of message data including telephone number data printed by the facsimile apparatus shown in FIG. 1.
Figure 6:
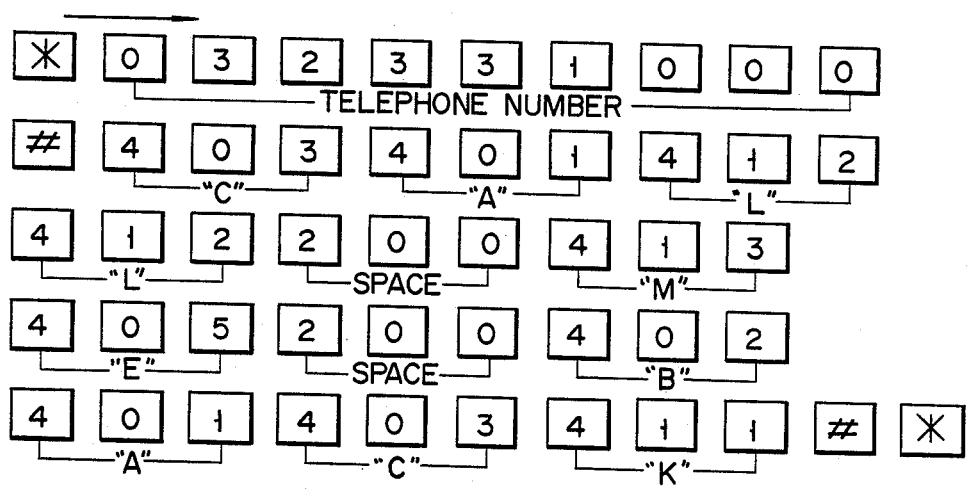
FIG. 6 is a view showing a key operation on a telephone set of a caller-side for transmitting a telephone number and message data in the facsimile apparatus shown in FIG. 5.

When the corresponding apparatus is a normal DTMF signal type telephone set, a calling signal from the corresponding apparatus is received, to switch circuit 33 from the first to the second switching position, and the asterisk signal is received from the corresponding apparatus. Subsequently, the number signal is received and stored in RAM 25. When the asterisk signal is received again, the number signal stored in RAM 25 is read out to be edited as printing data, together with a message and date and time data, and then printed out by printer 24 in a form as shown in FIG. 4.

Therefore, if the corresponding apparatus is of a DTMF signal type, although it is a normal telephone set which does not have a facsimile function, a dialing operation is performed first in the telephone set. Then, after a "beep" tone is generated by the answerback tone signal from the facsimile apparatus, the asterisk key is operated, and the telephone number thereof is dialed. Finally, the asterisk key is operated again, to transmit the telephone number to the facsimile apparatus. By the above operation of the corresponding apparatus, the facsimile apparatus can print out the telephone number of the corresponding apparatus, together with date and time data, and hence can record data relating to the caller. Therefore, the operator of the facsimile apparatus can call back the operator of the corresponding apparatus. In addition, since the telephone number of the corresponding apparatus is recorded by printing, the operator can know with certainty who called, even if he or she was not present or near the facsimile apparatus, at the time of the call. In this case, since date and time data is also printed out, the operator can know exactly when he or she was called.

Note that when the facsimile apparatus receives a calling signal from the corresponding apparatus and the facsimile apparatus is set in the automatic answering mode, a tone signal may be preset in RAM 25, so that a message "This is a facsimile. If you call by way of a key telephone set, depress the star button, input your telephone number, and then depress the star button again. You'll be called back later" is transmitted to the corresponding apparatus. In this manner, even if the operator of the corresponding apparatus does not know that the facsimile apparatus has a telephone-number recording function, he or she can easily understand the procedure outlined in the above message, so that the facsimile apparatus can be made more practical and convenient to use.

The facsimile apparatus shown in FIGS. 1 and 2 may have a function for printing not only a telephone number but also a key-in message, in response to a DTMF signal from a telephone set. For this purpose, a conversion table such as JIS codes or ASCII codes, shown in FIG. 5, is provided in ROM 26.

Such a telephone number and message data are generated as follows:

For example, in the flow chart shown in FIG. 3, when it is detected that a number key "#" is operated after "YES" in step SP3, input number data are sequentially fetched into RAM 25, as a telephone number. In response to the next key operation, that is, every time a predetermined number of keys, for example, three keys are operated, numeric data constituted by the predetermined number of numerals is converted into message data in accordance with the conversion table in ROM 26, and is sequentially stored in RAM 25. Then, after the # is depressed, when it is detected that the * key has been operated as in step SP4, the telephone number and message data, which are stored so far in RAM 25, are printed out.

The present invention has been described with reference to one embodiment, but is, however, not limited to the above embodiment. For example, in the above embodiment, the corresponding apparatus transmits a telephone number. However, if the corresponding apparatus is specified, a specific code may be transmitted instead of the telephone number. In addition, the name of the caller may be transmitted instead of the telephone number. Furthermore, a start/end key used for transmitting a telephone number or message data is not limited to an asterisk key, but may be a # key or a specific numeric key. Moreover, different keys may be used as start and end keys, respectively.

In addition, in the above embodiment, a facsimile apparatus is used as a communication terminal apparatus. However, a personal computer not having an image reader may be connected to a telephone network and used as a communication terminal apparatus.

What is claimed is:

1. A communication terminal apparatus comprising:
   switching means having a first port connected to a telephone network in an automatic receiving mode and a second port connected to the telephone network in an automatic answering mode;
   telephone circuit means, connected to said first port of said switching means, for generating a detection signal in response to a calling signal supplied through said switching means;
   data transfer means, connected to said second port of said switching means, for generating key-in and image data corresponding to DTMF signals and image information, which are supplied through said switching means;
   printing means;
   first memory means;
   second memory means for storing a conversion table from said key-in data to alpha-numeric character data; and
   controlling means for processing the generated key-in data, including:
     means for supplying a switching signal to said switching means, in response to the detection signal from said telephone circuit means, to set said switching means in the automatic answering mode and then transmitting an answer-back tone signal through said data transfer means and said switching means,
     means for converting to alphanumeric characters said generated key-in data received from the data transfer means based on said conversion table;
     means for sequentially storing the alpha-numeric characters output by said converting means in said first memory; and
     means for driving said printing means on the basis of the alpha-numeric characters stored in said first memory means.

2. An apparatus according to claim 1, wherein said first memory means has a memory area for storing predetermined message data, and said controlling means drives said printing means in response to a data input end signal, on the basis of the key-in and message data stored in said first memory means.

3. An apparatus according to claim 2, which further comprises a timer circuit, and in which said controlling means drives said printing means in response to the data input end signal, on the basis of time data from said timer circuit, in addition to the key-in and message data stored in said first memory means.

4. An apparatus according to claim 3, further comprising display means for displaying the alpha-numeric characters and the message data stored in said first memory means.

5. An apparatus according to claim 4, wherein said data transfer means includes a DTMF signal-detecting circuit and a modem cooperating therewith to supply keying and image data corresponding to both the DTMF signal and the image information, which are supplied through said switching means to said controlling means.

6. An apparatus according to claim 3, further comprising display means for displaying the alpha-numeric characters stored in said first memory means.

7. An apparatus according to claim wherein said data transfer means includes a DTMF signal-detecting circuit and a modem cooperating therewith to supply key-in and image data corresponding to both the DTMF signal and the image information, which are supplied through said switching means to said controlling means.

8. An apparatus according to claim 2, further comprising display means for displaying the alpha-numeric characters stored in said first memory means.

9. An apparatus according to claim, wherein said data transfer means includes DTMF signal-detecting circuit and a modem cooperating therewith to supply key-in and image data corresponding to both the DTMF signal and the image information, which are supplied through said switching means to said controlling means.

10. An apparatus according to claim, which further comprises a timer circuit, and in which said controlling means drives said printing means in response to the data input end signal, on the basis of time data from said timer circuit, in addition to the key-in data stored in said first memory means.

11. An apparatus according to claim 1, further comprising display means for displaying the alpha-numeric characters stored in said first memory means.

12. An apparatus according to claim 1, wherein said data transfer means includes a DTMF signal-detecting circuit and a modem cooperating therewith to supply key-in and image data corresponding to both the DTMF signal and the image information, which are supplied through said switching means to said controlling means.

13. An apparatus according to claim 1, wherein said telephone circuit means includes a telephone circuit connected between said first port of said switching means and said controlling means, and a detector for detecting that a calling signal is supplied to said telephone circuit, and then supplying said detection signal to said controlling means.

14. An apparatus according to claim 1, wherein said converting means is responsive to a data input start signal received from the data transfer means.

15. An apparatus according to claim 14, wherein said driving means is responsive to a data input end signal received from the data transfer means.

16. An apparatus according to claim 1, wherein said key-in data consists of numerical data, and said converting means converts the numberical data into letters data.

17. An apparatus according to claim 16, wherein said converting means is responsive to a predetermined plurality of numbers in the key-in data for each conversion into a corresponding letter.

18. An apparatus according to claim 17, wherein the first memory means is for storing said predetermined plurality of numbers in the key-in data, and the converting means converts said stored numbers into a corresponding letter.

19. An apparatus according to claim 18, wherein the first memory means stores all sequentially produced ones of the corresponding letters output by the converting means.

20. An apparatus according to claim 1, further comprising reading means for reading image information from a document, said data transfer means being couple to the reading means for generating image data corresponding to image information output by said reading means.

* * * * *